(12) United States Patent
Grams et al.

(10) Patent No.: US 7,422,240 B2
(45) Date of Patent: Sep. 9, 2008

(54) DEFORMATION DEVICE FOR A STEERING COLUMN

(75) Inventors: Kay-Uwe Grams, Cappeln (DE); Herniu Michalski, Brinkum (DE); Burkhard Schäfer, Ganderkesee (DE); Rainer Schmidt, Diepholz (DE)

(73) Assignee: ZF Lenksysteme Nacam GmbH, Lemförde (DE)

( * ) Notice: Subject to any disclaimer, the term of this patent is extended or adjusted under 35 U.S.C. 154(b) by 334 days.

(21) Appl. No.: 11/183,126

(22) Filed: Jul. 14, 2005

(65) Prior Publication Data

US 2005/0247532 A1 Nov. 10, 2005

(30) Foreign Application Priority Data

Jul. 23, 2003 (DE) ................. 103 33 748

(51) Int. Cl.
  *B62D 1/00* (2006.01)
(52) U.S. Cl. ..................................... 280/777
(58) Field of Classification Search ................ 280/777; 188/371; 74/492
  See application file for complete search history.

(56) References Cited

U.S. PATENT DOCUMENTS

| 3,428,150 | A |  | 2/1969 | Muspratt |  |
|---|---|---|---|---|---|
| 3,850,049 | A | * | 11/1974 | Adams et al. | 74/492 |
| 4,297,911 | A | * | 11/1981 | Grahn et al. | 280/777 |
| 5,464,251 | A | * | 11/1995 | Daumal Castellon | 280/777 |
| 5,685,565 | A | * | 11/1997 | Schafer et al. | 280/777 |
| 5,813,794 | A | * | 9/1998 | Castellon | 403/359.5 |
| 5,946,977 | A | * | 9/1999 | Sato et al. | 74/492 |
| 6,039,502 | A | * | 3/2000 | Naff et al. | 403/282 |
| 6,585,294 | B1 | * | 7/2003 | Faulstroh et al. | 280/777 |
| 2003/0034659 | A1 | * | 2/2003 | Summe et al. | 293/133 |

FOREIGN PATENT DOCUMENTS

| DE | 2 232 836 |  | 2/1973 |
|---|---|---|---|
| DE | 198 33 421 |  | 2/2000 |
| GB | 2234208 | A * | 1/1991 |
| JP | 08072727 |  | 3/1996 |

OTHER PUBLICATIONS

Machine Translated Document of German Patent No. DE 19833421.*

* cited by examiner

*Primary Examiner*—Lesley D. Morris
*Assistant Examiner*—Nicole Verley
(74) *Attorney, Agent, or Firm*—McGlew & Tuttle, P.C.

(57) ABSTRACT

A deformation device, especially for the steering column of a motor vehicle. The deformation device comprises a deformation tube (2), which can be deformed in a defined manner, as well as a deforming cone (1) associated with the deformation tube (2). The deformation device has at the deforming cone (1) at least one elevation (13, 28) or recess, whose edges (8) engage edges (9) of at least one impression (23, 25) or recess (10), whose shape corresponds to the elevation of the cone or the recess of the cone at the cone-side end of the deformation tube (2), in a positive (material blocking) manner, as a result of which essentially any desired high torque can be transmitted between the deformation tube (2) and the deforming cone (1) without any change in the good behavior in a collision. The design of deformation devices, especially for steering lines of motor vehicles, can be substantially simplified and despite the improvement in product quality that is made possible, considerable cost savings are achieved in the manufacture of steering line components for motor vehicles.

30 Claims, 5 Drawing Sheets

DEFORMATION DEVICE FOR A STEERING COLUMN

CROSS REFERENCE TO RELATED APPLICATION

This is a continuation of and claims the benefit (35 U.S.C. §120 and 365(c)) of copending International Application PCT/DE 2004/001591 of Jul. 22, 2004, which designated inter alia the United States and which claims the priority of German Application DE103 33 748.2 of Jul. 23, 2003. The entire contents of each application is hereby incorporated by reference in its entirety.

FIELD OF THE INVENTION

The present invention pertains to a deformation device, especially for the steering column or the steering line (steering components) of a motor vehicle wherein the deformation device comprises a deformation tube, which can be deformed in a defined manner at least at one end, as well as a deforming cone, which is associated with the deformable end of the deformation tube.

BACKGROUND OF THE INVENTION

Deformation devices of the type mentioned in the introduction are used, for example, but by no means exclusively, in steering columns of motor vehicles and are intended, on the one hand, to absorb kinetic energy occurring during a collision of the vehicle. On the other hand, deformation devices of this type are to prevent parts of the steering line or the steering wheel from penetrating into the passenger compartment because of deformations occurring in a collision and from leading to injury to the driver.

Such a deformation device is known, for example, from DE 198 33 421 C2. This prior-art deformation device, which forms part of the steering line of a motor vehicle, comprises a steering column jacket and a conical component, wherein the conical component can penetrate into the steering column jacket in case of a collision of the vehicle while the end of the steering column jacket expands. In case of a correspondingly deep penetration of the conical component into the steering column jacket, the steering column jacket is able to be pulled apart along predetermined breaking points, which are formed by groove-like weakened areas of material, after which the steering column jacket is rolled up in strips because of the special shape of the conical component. Kinetic energy is dissipated in a defined manner due to the expanding, pulling apart and rolling up, and paths of deformation due to the collision are absorbed in the steering line in a defined manner, without parts of the steering line or the steering wheel penetrating into the passenger compartment.

The value of the breakaway force of the connection between the cone and the steering column jacket, which is designed as a press fit, is decisive for the proper function of such deformation devices. This breakaway force must not exceed, under any circumstances, certain maximum values, which depend, for example, on the manner of anchoring of the cone at the cockpit or physiological conditions of the human upper body, because there is otherwise a risk of severe injuries to the driver, for example, because of the penetration of the steering wheel into the passenger compartment or because of unacceptably strong forces of resistance of the steering wheel during the impact of the upper body or the head on the steering wheel. The maximum allowable breakaway force is thus one of the decisive factors for dimensioning the press fit between the cone and the steering column jacket.

However, the maximum torques that can be transmitted between the cone and the steering column jacket by frictional engagement is automatically also limited with the dimensioning of the press fit connection between the cone and the steering column jacket, which is thus inevitably limited as well. However, it may be desirable under certain circumstances in case of unchanged value of the breakaway force between the cone and the steering column jacket in the axial direction to make it possible to transmit higher torques between the steering column jacket and the cone. This happens, for example, when the steering column jacket is to be used for the torsional stabilization of other assembly units arranged at the cone or at the upper steering column.

Another case, in which the transmission of high torques between the steering column jacket and the cone is important, is the use of such a deformation device, for example, in a drag link, in which case the steering column jacket assumes both the deformation and energy absorption functions in a collision and the torque transmission function for steering movements during normal operation of the vehicle. Another aspect in relation to the transmission of increased torques is the increasing use of electric power steering, whose drive is often no longer arranged in the area of the steering gear but rather in the area of the upper steering column. As a result, it is necessary to continuously transmit not only the steering torque applied by the driver but also the entire steering torque via the largest part of the steering line, which likewise imposes increased requirements on the torsional strength of the connection between the cone and the steering column jacket.

SUMMARY OF THE INVENTION

Against this background, the object of the present invention is to provide a deformation device with which the drawbacks can be overcome. The deformation device shall be suitable, in particular, for transmitting high torques, without the parameters of the deformation device, that determine the behavior in a collision, being affected or even compromised hereby.

The deformation device according to the present invention has, in the manner known per se, a deformation tube, which is designed at least at one of its ends such that it is deformable in a defined manner. However, the deformation may take place, for example, but by no means exclusively, by turning over, expansion and/or pulling apart. In a likewise known manner, the deformation device has at least one deforming cone, which is associated with the deformable end of the deformation tube and whose penetration into the deformation tube in case of a collision brings about the deformation of the deformation tube. To transmit torques, the deforming cone is pressed into the end of the deformation tube in a partially non-positive (surface friction connection) manner.

However, the deformation device is characterized according to the present invention by the deforming cone having at least one elevation or recess arranged essentially along its surface lines. Edges formed by the elevation of the cone and the recess of the cone, which edges likewise extend along surface lines of the cone, engage the edges of impressions having a corresponding shape and the edges of recesses having a corresponding shape, which are arranged at the end of the deformation tube, in a positive manner (a material blocking connection).

This means at first that the connection between the deformation tube and the deforming cone is now a combination of non-positive connection and positive (non frictional—material blocking) connection, but features and parameters that determine the non-positive connection and positive connection can be designed and dimensioned independently from one another. In particular, the non-positive connection or press fit between the deforming cone and the deformation tube, which determines the behavior in a collision, can be set, as before, completely independently from the desired torsional strength of the connection between the deforming cone and the deformation tube, because high torques, which exceed the forces that can be transmitted by means of non-positive connection, can be readily transmitted by the positive connection, which is additionally present.

The elements of the deforming cone and of the deformation tube by which the edges of these two parts are formed, which edges have mutually corresponding shapes, are not decisive for the essence of the present invention as long as reliable transmission of torque by means of positive connection can thus be guaranteed in addition to the existing non-positive connection. However, the elevations of the deforming cone are formed by an area of the deforming cone having the shape of an n-sided truncated pyramid according to a preferred embodiment of the present invention. This means that the edges of the deformation tube whose shape corresponds to it are formed—in the simplest case by pressing the deformation tube onto the deforming cone—by the area of the deforming cone having the shape of a truncated pyramid likewise deforming the deformation tube in the shape of a truncated pyramid. However, the end of the deformation tube may just as well be deformed correspondingly on the inner side already before the mounting of the deformation tube and the deforming cone.

Besides its especially great simplicity, this embodiment has the additional advantage that the edges and surfaces formed by the truncated pyramid-shaped area of the deforming cone also act additionally as cutting edges and guide surfaces, which support the controlled separation and deformation or rolling up of the deformation tube in case of a collision, besides their function as positive-locking, torque-transmitting elements.

The action of the cutting edges of the truncated pyramid-shaped area of the deforming cone in respect to torque transmission and the control of the behavior during a collision can additionally also be effectively supported, as provided for according to another preferred embodiment of the present invention, by groove-like weakened areas of material, which are arranged along the deformation tube and are likewise used for the controlled pulling apart and deformation of the deformation tube. By varying the wall thickness of the deformation tube and by varying the number and the arrangement of the weakened areas of material, the behavior of the deformation device can be adapted to the stresses to be expected in a broad range.

However, it is also possible to use a deformation tube completely without the groove-like weakened areas of material, because the edges and surfaces of the truncated pyramid-shaped area ensure, contrary to the state of the art, the controlled cutting open and deformation of the deformation tube in case of a collision without additional measures as well.

According to another embodiment of the present invention, the edges of the deformation tube that correspond in shape to the edges of the elevations of the deforming cone are formed by short incisions, which extend along surface lines of the deformation tube and are arranged at the end of the deformation tube. These incisions are prepared before the end of the deformation tube is expanded, so that the incisions become V-shaped recesses with two edges each due to the subsequent expansion of the deformation tube, and the edges of corresponding elevations of the deforming cone can in turn engage these recesses.

This is advantageous insofar as the edges of the deformation tube that are needed for the torque transmission can thus be prepared in an extremely simple manner.

According to another preferred embodiment of the present invention, the edges of the deformation tube that are used to transmit torque are formed by folded straps, which point toward the interior of the deformation tube and are arranged in the area of at least one end-side notch of the deformation tube. The notch may be arranged either as an open notch at the end of the deformation tube or also with a closed circumference in the area of the end of the deformation tube. A closed notch has, in particular, the advantage of being able to transmit especially high torques. The folded straps engage corresponding recesses of the deforming cone, which have a corresponding shape, as a result of which the torque transmission between the deformation tube and the deforming cone is in turn made possible. Besides the edges extending essentially in the longitudinal direction of the deformation tube, which are used to transmit torque, the folded straps may, however, also have additional edges, which extend, for example, in the circumferential direction of the deformation tube. The fastening of the deforming cone in the deformation tube can thus be secured additionally against the undesired pulling out of the deforming cone from the deformation tube in the axial direction.

For the additional, especially accurate control of the deformation of the deformation tube in case of a collision, the deforming cone may comprise, as is provided according to another preferred embodiment of the present invention, a cross-sectional area expanding in a trumpet-shaped or torus-shaped manner. Due to the trumpet-shaped or torus-shaped course of the surface of the deforming cone, it can be achieved that the deformation tube cut up by the edges or cutting edges in the form of strips in case of a collision will be deformed in a controlled manner in such a way that the strips are rolled up into relatively narrow coils. As a result, the mechanical energy dissipated by the deformation of the deformation tube can be dimensioned especially accurately; in addition, the controlled rolling up of the cut-up strips of the deformation tube prevents risks that may be caused by the rapid movement of the sharp-edged metal strips.

In addition, the deforming cone may also comprise a bearing seat for receiving a mount for the steering axle, as is provided for according to another embodiment of the present invention. This makes it possible, on the one hand, to reduce the number of components necessary in the area of the steering column. On the other hand, the strong forces generated in case of a collision, for example, due to the impact of the upper body on the steering wheel, can thus be introduced directly into the deforming cone, where they can be made harmless by the deformation of the deformation tube.

The deformation device according to the present invention can also be used, for example, in the drag link, besides its use in the upper part of the steering column. Provisions are made for this purpose according to another embodiment of the present invention for the deforming cone to comprise a fork of a cardan joint of the steering axle. In other words, this means that both the deformation tube and the deforming cone thus assume a dual function by being used both to absorb energy in case of a collision and at the same time as torque-transmitting elements in the steering line for the normal operation of the steering mechanism.

In addition, the deformation device according to the present invention can also be used with a similar dual function in the upper part of the steering line. According to another embodiment of the present invention, provisions are made for this purpose for the deforming cone to be part of the steering wheel and to be connected with the steering wheel in such a way that they rotate in unison. The deformation tube now forms the upper part of the steering axle at the same time. It is even conceivable in this manner that the extremely complicated telescoping steering axle, which has additionally always been necessary hitherto, will be abandoned, because its task of transmitting torque can now also be assumed by the deformation tube.

To further improve the ability to transmit high torques and to tear up the deformation tube in a controlled manner into individual strips in case of a collision, provisions are made according to another embodiment of the present invention for the elevations of the deforming cone, whose edges engage the deformation tube, to comprise attachments with edges extending essentially in the radial direction of the cone. These attachments may be, for example, but by no means exclusively, in the form of the cylindrical or prismatic extensions, which rise essentially in the radial direction at the base of the trumpet-shaped or torus-shaped surface of the deforming cone. As a result, an extremely effective securing can be achieved against rotation, in particular, between the deforming cone and the deformation tube.

However, the elevations of the deforming cone may also be in the form of attachments with cutting edges extending essentially in the radial direction of the cone, which are arranged at the base of the trumpet-shaped or torus-shaped surface of the deforming cone. As a result, it is likewise possible to transmit high torques; however, the controlled pulling apart of the deformation tube into individual strips can also be supported in an extremely effective manner by this design of the deforming cone in case of a collision.

The present invention will be explained in greater detail below on the basis of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
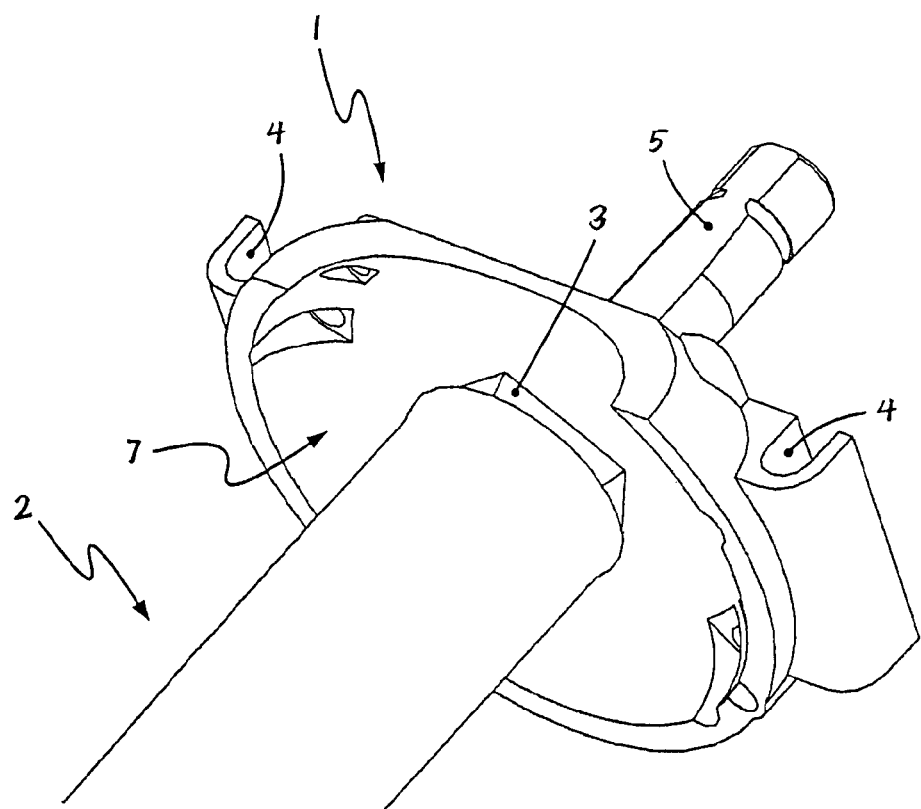
FIG. 1 is a schematic perspective view of a first embodiment of a deformation device according to the present invention.

Referring to the drawings in particular, FIG. 1 shows a perspective view of a first embodiment of a deformation device according to the present invention. A deforming cone 1 as well as a deformation tube 2 can be recognized at first. The deformation tube 2 is pressed onto the deforming cone 1, as a result of which the truncated pyramid-shaped area 3 of the deforming cone 1, which is visible only partially in FIG. 1, has penetrated into the deformation tube 2 while the cone-side end of the deformation tube 2 has expanded. Due to this expansion of the deformation tube 2, the end of the deformation tube 2 assumes a slightly tulip-like shape with edge-like weakened areas of material impressed especially on its inner side by the edges of the truncated pyramid-shaped area 3 of the deforming cone 1 as well as with flattened areas located in between.

The edges and surfaces of the deforming cone 1 and the deformation tube 2 thus formed, whose shapes correspond to each other, are used to reliably transmit even higher torques, which may far exceed the torques that can be transmitted by press fit alone. Such high torques may develop in case of the embodiment of the deformation device shown in FIGS. 1 and 2, for example, due to the fact that a knee of the driver impacts the cockpit from below in case of a collision and it thus applies a high torque load on the deforming cone 1 connected with the structure of the cockpit. For connection with the cockpit structure, the deforming cone 1 being shown here has recesses 4, which can engage projections, e.g., round rods, at the cockpit, which have, for example, a corresponding shape.

A projection of the steering axle 5 on the side of the deforming cone 1 facing away from the deformation tube 2 can also be seen in FIG. 1. For example, the steering wheel is connected with the steering axle 5 here. The upper bearing of the steering axle 5 is integrated within the deforming cone 1; however, this is not shown in FIGS. 1 and 2.

Figure 2:
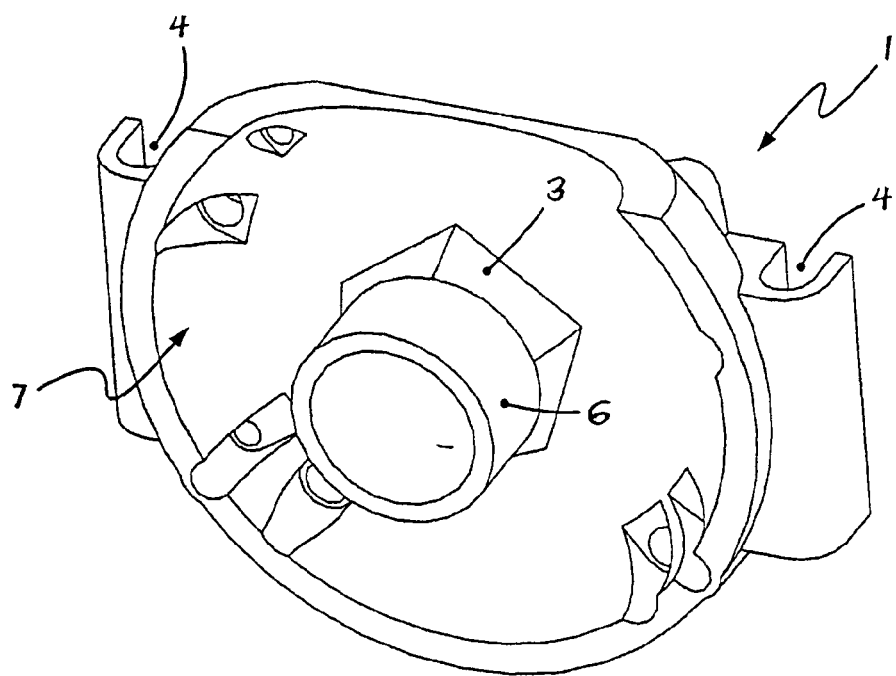
FIG. 2 is a schematic perspective view similar to that in FIG. 1 showing the deforming cone of the deformation device.

FIG. 2 shows the deforming cone 1 of the deformation device according to FIG. 1, the deformation tube 2 having been removed in FIG. 2 to make it possible to better recognize the shape and the structure of the deforming cone 1. The contact area between the deforming cone 1 and the deformation tube 2, which contact area comprises a cylindrical area 6 and a truncated pyramid-shaped area 3 adjoining the cylindrical area 6, can be recognized, in particular. When the deforming cone 1 and the deformation tube 2 are assembled, the cylindrical area 6 is pressed fully and the truncated pyramid-shaped area 3 is pressed partially into the deformation tube 2.

A press fit, which ensures at first a stable anchoring between the deforming cone 1 and the deformation tube 2, is formed now between the external diameter of the cylindrical area 6 of the deforming cone 1 and the internal diameter of the deformation tube 2. However, higher torques, which may occur, for example, in case of a collision of the vehicle or even under shock-like loads in the area of the steering arms, can be absorbed by a combination of non-positive connection in the cylindrical area 6 of the deforming cone 1 and positive connection in the truncated pyramid-shaped area 3 of the deforming cone 1, always together with the corresponding areas of the deformation tube 2.

In addition, FIGS. 1 and 2 show the trumpet shape or torus shape 7 of the outer area of the deforming cone 1. The deformation tube 2 and the deforming cone 1 are pushed toward one another by the forces occurring in case of a collision. As a result, the deformation tube 2 is pushed over the truncated pyramid-shaped area 3 of the deforming cone 1, as a result of which it is at first expanded additionally. As the forces increase further, the correspondingly dimensioned deformation tube 2 is pulled apart in the area of the edges of the truncated pyramid-shaped area 3 of the deforming cone 1 in the longitudinal direction of the tube and is thus pulled apart into individual longitudinal strips. These longitudinal strips are deflected radially outwardly by the shape 7 of the deforming cone 1 imitating the inner side of a torus during the further penetration of the deformation tube 2 into the deforming cone 1 and finally rolled up in individual coils. An especially well-definable, reliable and controlled dissipation of energy is made possible by this in case of a collision.

Figure 3:
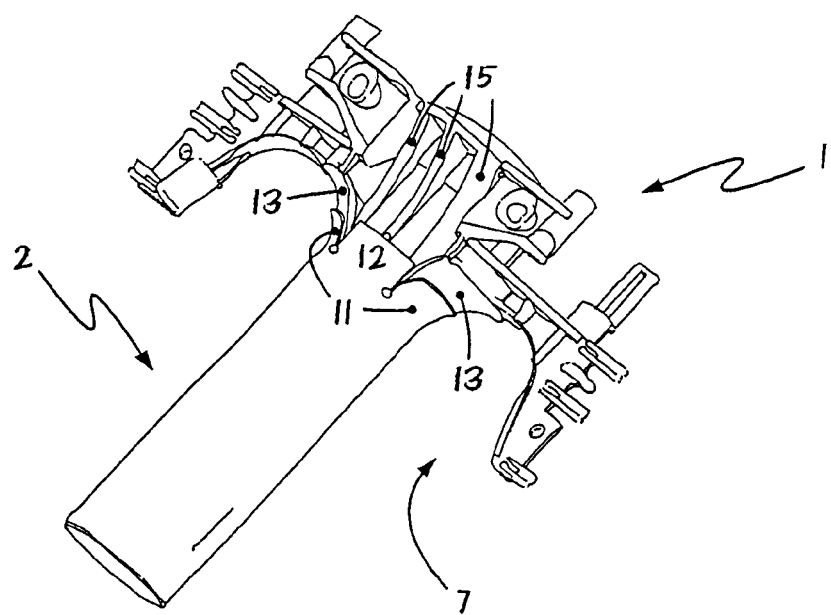
FIG. 3 is a side view showing another embodiment of a deformation device according to the present invention.
Figure 4:
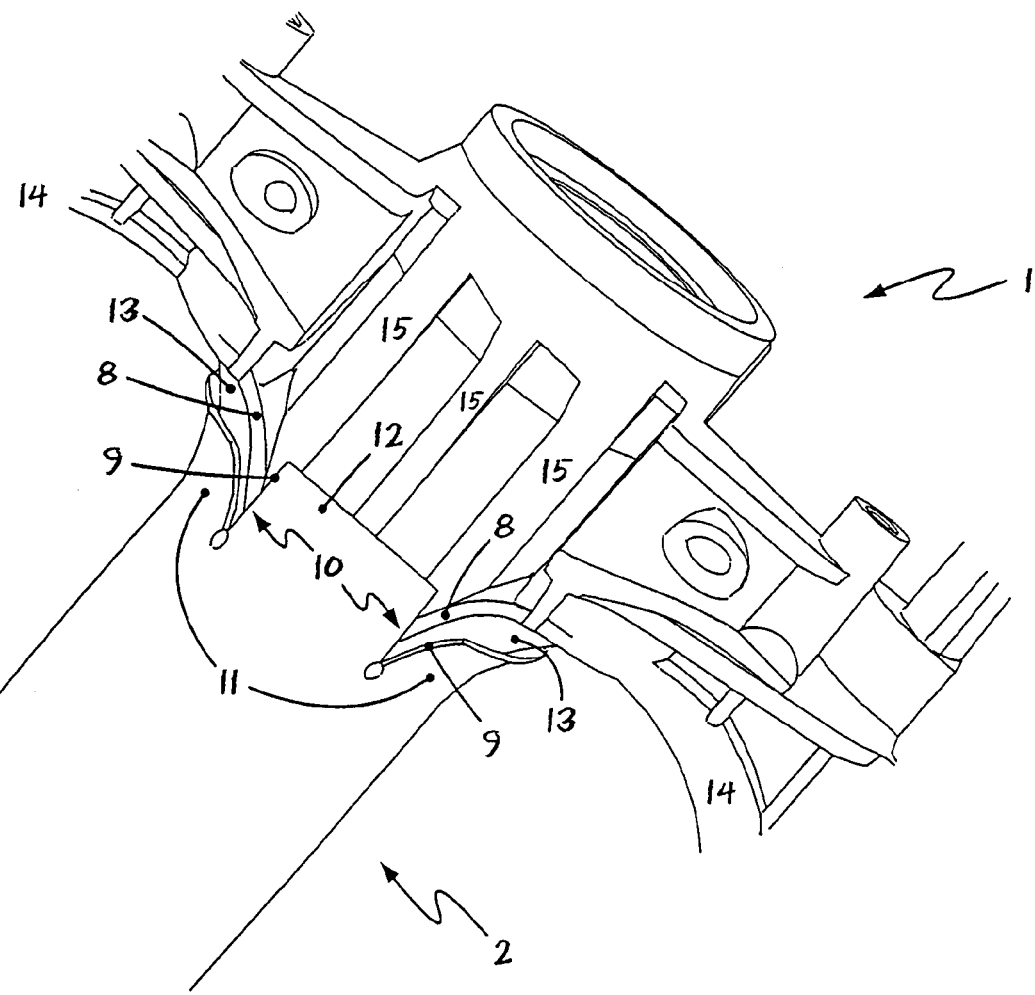
FIG. 4 is an enlarged view of the deformation device according to FIG. 3.

FIGS. 3 and 4 show another embodiment of a deformation device according to the present invention. The deforming cone 1, which can be connected, for example, with attached parts of the cockpit, as well as the deformation tube 2 pressed onto a cylindrical extension of the deforming cone 1, can be recognized at first. The enlarged view in FIG. 4 shows, in particular, how the edges 8 and 9 of the deforming cone 1 and the deformation tube 2, whose shapes correspond to one another, are formed, and in what manner these edges 8 and 9 engage one another or are in contact with one another, forming a torsionally rigid connection.

Recesses arranged in the longitudinal direction at the end area of the deformation tube 2 in the form of incisions 10 can be recognized at first in this connection. A number of straps 11, 12, which are associated each with different areas 13, 14 of the deforming cone 1, are created by these incisions. Thus, when the deforming cone 1 is pressed into the end of the deformation tube 2, the straps 11 will come to lie on corresponding ramp-like areas 13 of the deforming cone 1, as a result of which these straps 11 are bent to the outside and expanded in a funnel-shaped manner corresponding to the ramp-like areas 13. However, the other straps 12 arranged between the straps 11 bent to the outside retain their original orientation and come to lie in corresponding longitudinal recesses or depressions of the funnel-shaped area of the deforming cone 1, which are arranged between two ramp-like areas 13 each or between two edges 8 each.

In other words, this means that the straps 11, 12 formed at the end of the deformation tube 2 are bent alternatingly to the outside and remain undeformed, as a result of which the longitudinal edges 9 of these straps 11, 12 are exposed. The edges 9 of the undeformed straps 12 will form the positive, torsionally rigid connection between the deforming cone 1 and the deformation tube 2 with the edges 8, which are arranged at the deforming cone 1 and the distance between which corresponds to the width of the straps 12.

Similarly to the embodiment shown in FIGS. 1 and 2, the deforming cone 1 of the embodiment according to FIGS. 3 and 4 likewise has an essentially trumpet-shaped or torus-shaped course in the outer area. However, this is divided into individual surface areas in the embodiment according to FIGS. 3 and 4, the areas 14 being responsible for the deformation of the already pre-deformed straps 11 of the deformation tube 2 and the ramps 15 being responsible for the deformation of the initially still straight straps 12 of the deformation tube 2.

Figure 5:
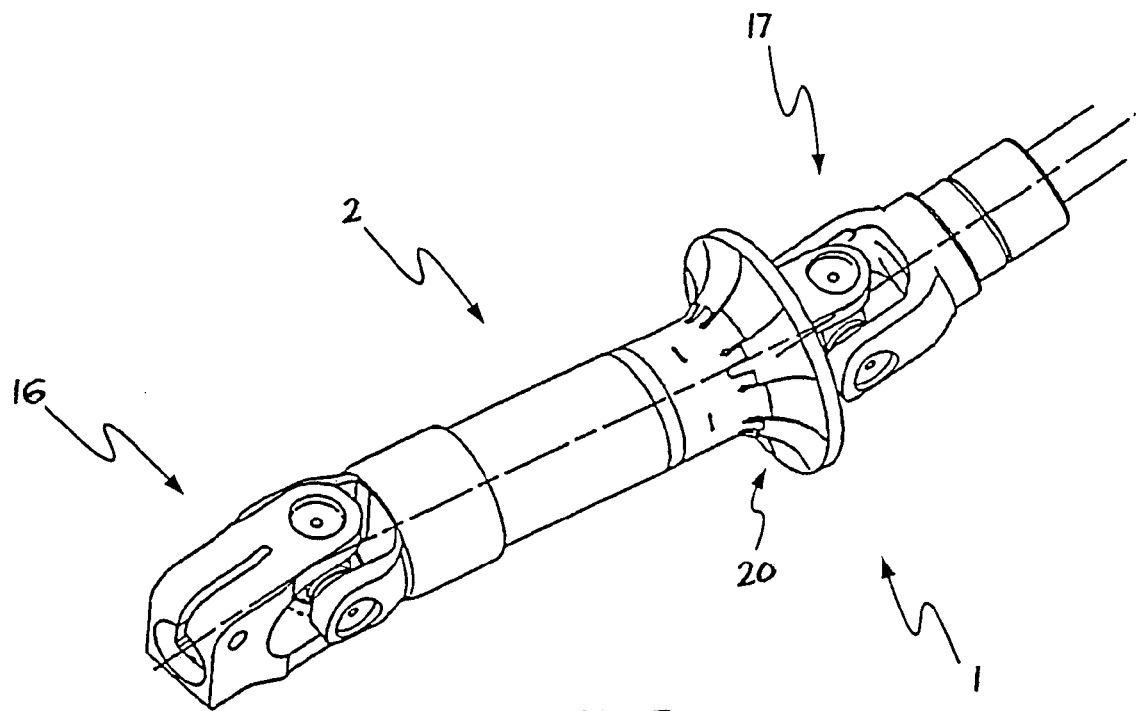
FIG. 5 is a perspective view showing a deformation device for a drag link.
Figure 6:
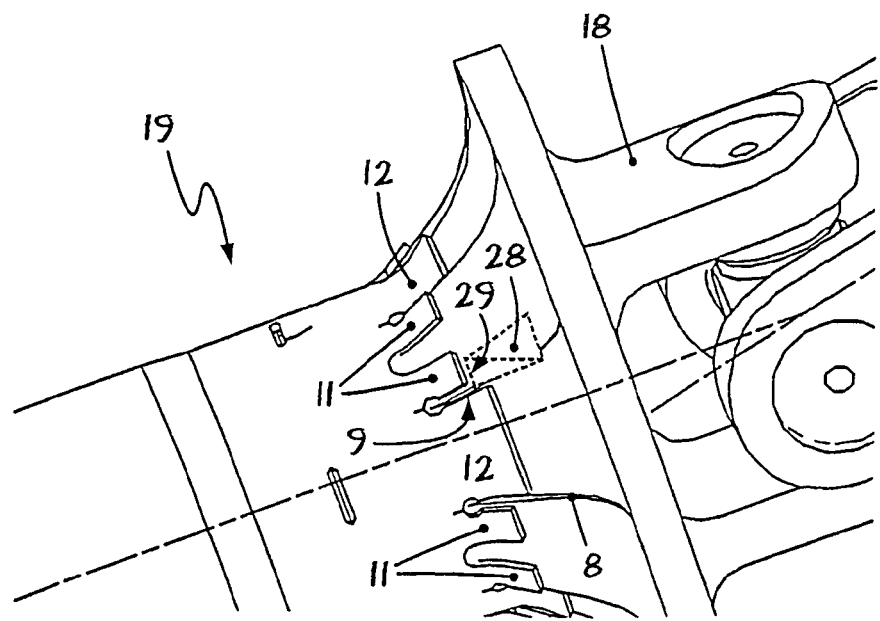
FIG. 6 is an enlarged view of the deformation device according to FIG. 5.

FIGS. 5 and 6 show an embodiment of a deformation device according to the present invention, which is especially suitable for use in the area of a drag link. The drag link, which is limited by two cardan joints 16, 17 and forms the deformation tube 2 at the same time, can be recognized, for example, the steering gear joining at the cardan joint 16 that is the left-hand cardan joint in the drawing and, for example, the upper steering column joining at the cardan joint 17 that is the right-hand cardan joint in the drawing.

Furthermore, the deforming cone 1, which is integrated into one unit with the joint fork 18 of the cardan joint 17 and is in turn pressed with an essentially cylindrical area 19 into the end of the deformation tube 2, which forms the drag link at the same time, can be recognized in FIGS. 5 and 6. To transmit high torques, which may also include especially steering torques in this case, the cone-side end of the drag link is divided into a plurality of straps 11, 12 extending in the longitudinal direction of the drag link.

The edges 9 of these straps 11, 12 engage edges 8 of a corresponding shape at the deforming cone 1, which are formed by a step-shaped or rectangular structure 20 comprising alternating elevations and depressions in the deforming cone 1. The transmission of high torques can thus be reliably guaranteed, while the structure of the straps 11, 12 of the deformation tube 2 and the associated edges 8 of the deforming cone 1 at the same time ensure a reliable and defined deformation and separation of the deformation tube 2 in case of a collision.

Instead of or in addition to the edges 8 formed by the step-shaped or rectangular structure 20 of the deforming cone 1, the deforming cone 1 may also comprise attachments or elevations 28, which are arranged at the base of the trumpet-shaped area or in the overlapping area with the straps 11, 12 of the deformation tube 2, are indicated by dash-dotted line here and may be additionally provided with cutting edges 29. Due to the engagement of the edges or cutting edges 29 of such attachments 28 extending essentially in the radial direction, it is possible both to transmit high torques and also to support the controlled pulling apart of the deformation tube 2 in case of a collision especially well.

Figure 7:
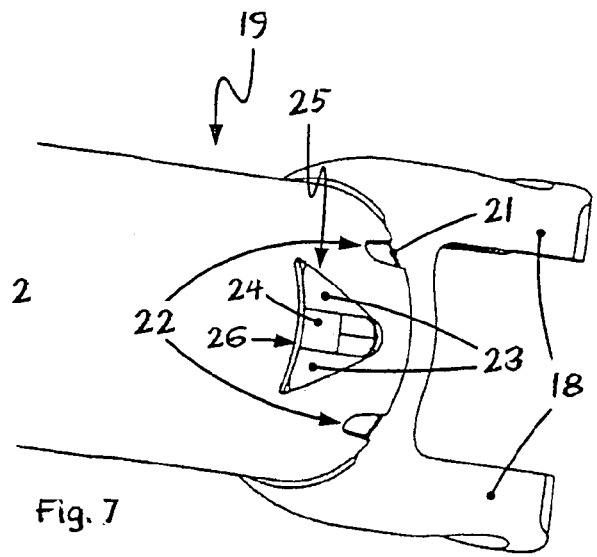
FIG. 7 is a perspective view showing another embodiment of a deformation device for a drag link.
Figure 8:
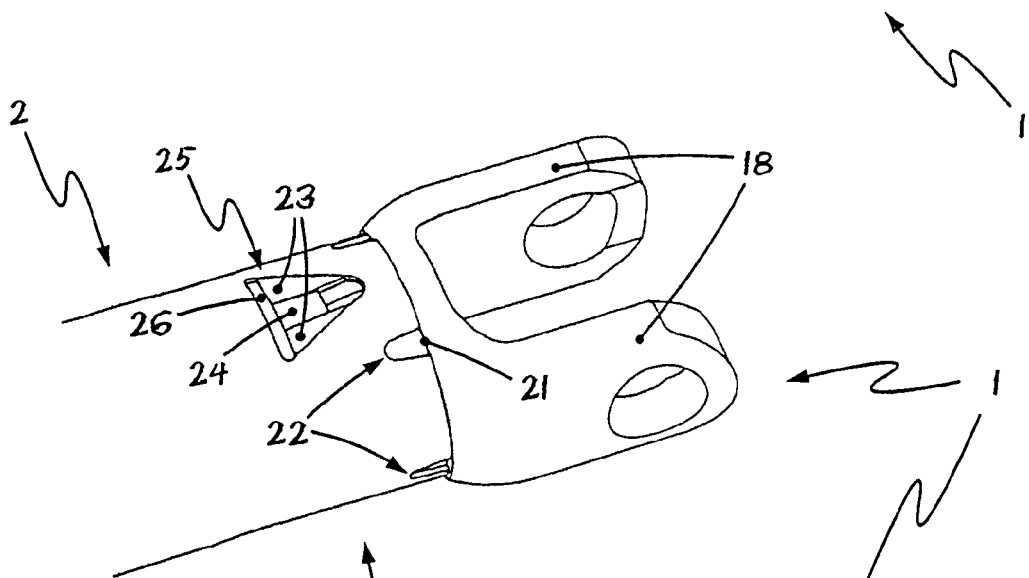
FIG. 8 is another perspective view showing the embodiment of the deformation device for a drag link of FIG. 7.
Figure 9:
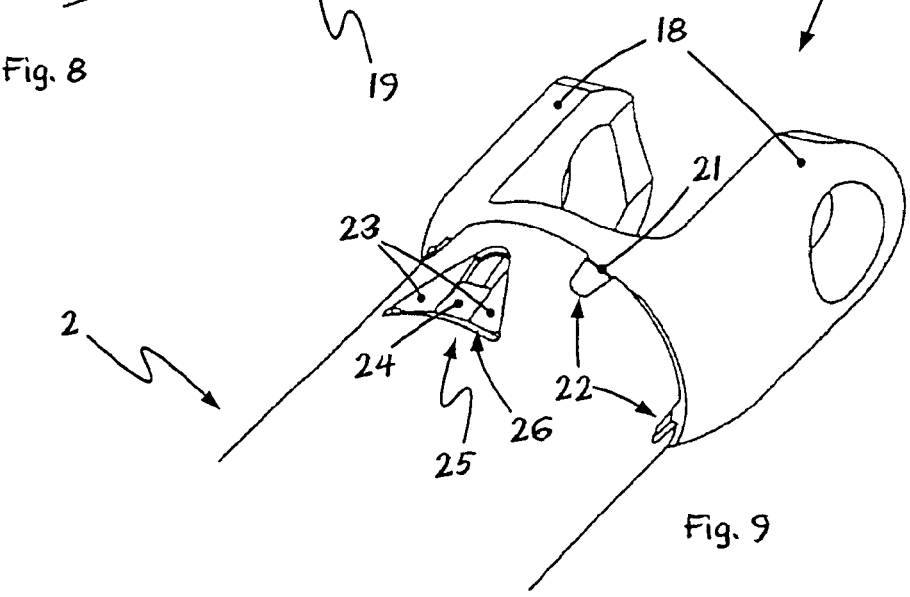
FIG. 9 is another perspective view showing the embodiment of the deformation device for a drag link of FIG. 7.

FIGS. 7 through 9 show different views of another embodiment of a deformation device comprising a deforming cone 1 and a deformation tube 2. Large parts of the trumpet-shaped area of the deforming cone 1 were eliminated in this embodiment, as a result of which essentially only the circumferential limiting edge 21 between the joint fork 18 and the cylindrical area 19 of the deforming cone 1, as well as the shoulders of the joint fork 18 adjoining same are responsible for the expansion and deformation of the deformation tube 2 in case of a collision here. This expansion and deformation of the deformation tube 2 is supported by the slot-shaped recesses 22 at the end of the deformation tube 2.

The task of transmitting high torques is accomplished in the embodiment shown in FIGS. 7 through 9 by a combination of folded straps 23 with the contours 24 at the cylindrical part of the deforming cone 1, where the shape of these contours corresponds to the edges of these straps. The folded straps 23 of the deformation tube 2 are arranged at the inner circumference of notches 25 in the end area of the deformation tube 2. The contours 24 at the deforming cone 1, where the shape of the contours corresponds to the edges of these straps 23, are formed by small, approximately cuboid elevations 24, which are in turn arranged in recesses, in the cylindrical area 19 of the deforming cone 1.

This embodiment combines the advantage of an extremely simple and consequently inexpensive design with the additional possibility of securing the deforming cone 1 or the joint fork 18 against being pulled axially out of the end of the deformation tube 2 or the drag link. The deforming cone 1 and the joint fork 18 have additional elevations and edges 26, respectively, in their cylindrical areas, which elevations and edges extend in the circumferential direction and engage additional edges of the deformation tube 2, which are likewise formed by the impressions in the form of folded straps 23, in a (material blocking) positive manner.

In other words, this means that the deforming cone 1 and the joint fork 18 as well as the deformation tube 2 and the drag link can be mounted in this embodiment essentially by means of a combined press fit and snap connection. This combined press fit and snap connection combines the tasks of transmitting high torques and the dissipation of mechanical energy in case of a collision in an advantageous and cost-saving manner.

Figure 10:
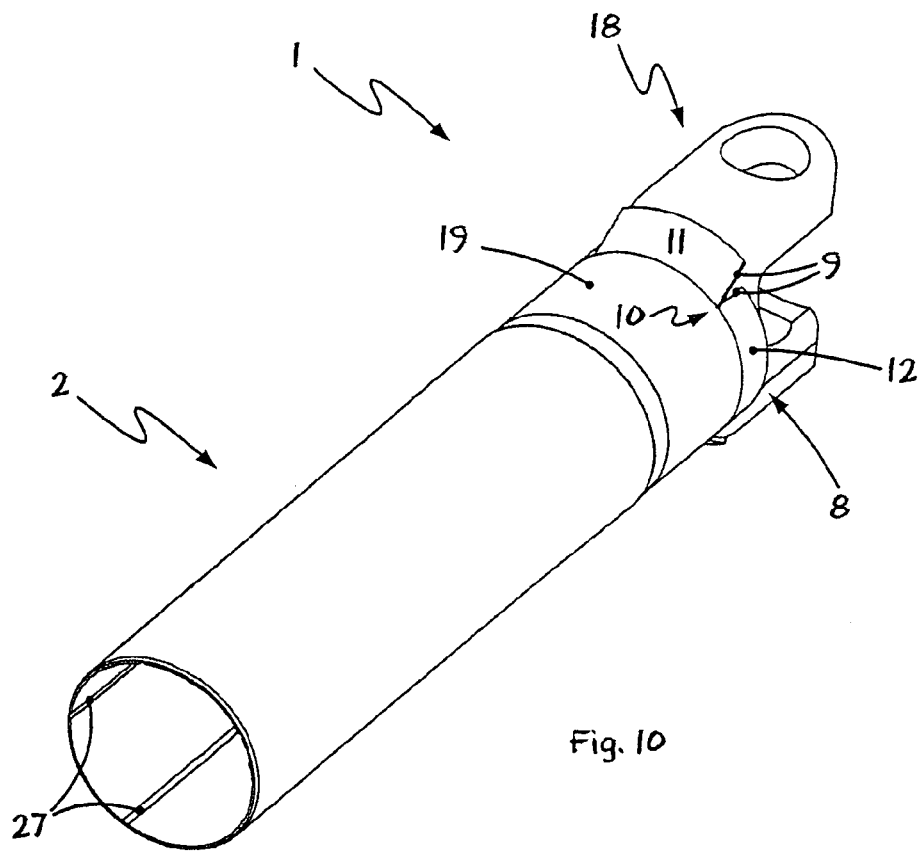
FIG. 10 is a perspective view showing a third embodiment of a deformation device for a drag link.
Figure 11:
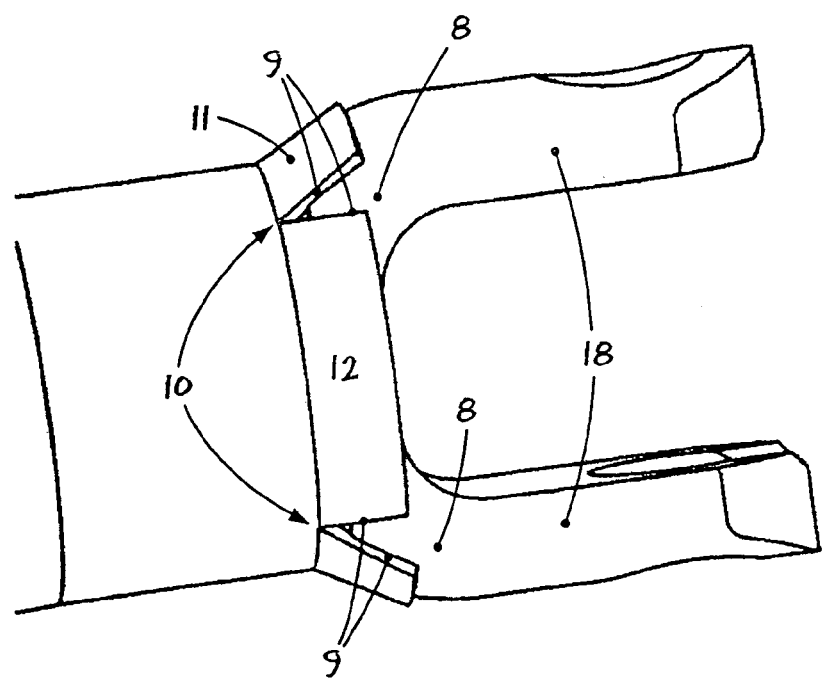
FIG. 11 is an enlarged view of parts of the deformation device according to FIG. 10.

FIGS. 10 and 11 show another embodiment of a deformation device. The deforming cone 1, designed as a fork 18 of a cardan joint, for example, for a drag link 2, as well as a deformation tube 2, which is pressed in the area 19 with an essentially cylindrical extension of the joint fork 18 and of the deforming cone 1, can be recognized at first.

The positive connection between the joint fork 18 and the drag link 2, which is also present in this embodiment in respect to torsion, is again formed by the cooperation of edges 9 of tube end-side short recesses 10, which said edges are designed as cutting edges, in the form of incisions in the drag link 2, as well as opposite edges or stop faces 8 on the joint fork 18, which are associated with the edges 9. The edges 9 of the incisions 10 into the deformation tube 2 are in turn exposed for the purpose of being engaged by the joint fork 18 by the straps 11, 12 defined by two adjacent incisions 10 each at the end of the drag link 2 being bent alternatingly to the outside (11) and alternatingly not being deformed (12).

The expanding action of the joint fork 18 as a deforming cone 1, which becomes effective in case of a collision, is assumed by the two oblique outer shoulders of the joint fork 18 in this embodiment as well. The joint fork 18 and the drag link 2 are pushed toward one another in case of a collision and the joint-side end of the drag link 2 is at first expanded by the shoulders of the joint fork 18 and finally pulled apart into four individual strips.

To support the controlled and defined deformation and pulling apart of the drag link 2 in case of a collision, the drag link 2 has groove-like weakened areas 27 of material, which extend in the longitudinal direction on the inner side of the tube and open at the base of the tube end-side incisions 10 of the drag link 2.

It becomes clear as a result of what was stated above that thanks to the present invention, the design of deformation devices, especially for steering lines of motor vehicles, can be substantially simplified. At the same time, both the safety of the steering lines thus equipped during operation and the reproducibility of the behavior of the steering line in case of a collision can be considerably improved, and the deformation device according to the present invention can also be an energy-consuming and torque-transmitting element of the steering line at the same time. Despite the improvement in product quality, which is made possible by the present invention, considerable simplifications and cost savings are achieved at the same time in the manufacture of steering lines for motor vehicles thanks to the present invention.

While specific embodiments of the invention have been shown and described in detail to illustrate the application of the principles of the invention, it will be understood that the invention may be embodied otherwise without departing from such principles.

APPENDIX

Lift of Reference Numbers

1 Deforming cone
2 Deformation tube
3 Truncated pyramid-shaped area
4 Prismatic recesses
5 Steering axle
6 Cylindrical area
7 Trumpet or torus shape
8 Edge
9 Edge
10 Recess
11 Strap
12 Strap
13 Area
14 Area
15 Ramps
16 Cardan joint
17 Cardan joint
18 Joint fork
19 Cylindrical area
20 Rectangular structure
21 Limiting edge
22 Slot-like recess
23 Impression
24 Elevation
25 Impression
26 Edges
27 Recess (weakened area of material)
28 Elevation
29 Cutting edge

What is claimed is:

1. A deformation device of a motor vehicle the deformation device comprising:
    a deformation tube, which can be deformed in a defined manner at least at one end, said deformation tube including at least one elevation, impression or recess with edges;
    a deforming cone associated with the deformable end of the deformation tube, said deforming cone having at least one elevation or recess with edges that correspond in shape to and engage said edges of said at least one elevation, impression or recess of said deformation tube, in a positive manner, said deforming cone being pressed partially into the end of said deformation tube in a non-positive manner, said edges of said deformation tube overlapping with said edges of said deforming cone in a radial direction of said deforming cone and said deformation tube such that said edges of said deformation tube engage said edges of said deforming cone in a circumferential direction of said deforming cone and said deformation tube, said edges of said deforming cone and said edges of said deformation tube being arranged side by side in a peripheral direction of said deforming cone and said deformation tube.

2. A deformation device in accordance with claim 1, wherein the elevations of said deforming cone are formed by a truncated pyramid-shaped area of the deforming cone, said truncated pyramid-shaped area having at least two sides.

3. A deformation device in accordance with claim 1, wherein the edges of said deformation tube, whose shape corresponds to the edges of the elevations of said deforming cone, are formed by groove-like recesses arranged on the inner circumference of the deformation tube in the longitudinal direction.

4. A deformation device in accordance with claim 1, wherein the edges of said deformation tube, whose shape corresponds to the edges of the elevations of said deforming cone, are formed by short incisions into said deformation tube, which short incisions extend along surface lines of said deformation tube and are prepared before an end-side expansion.

5. A deformation device in accordance with claim 1, wherein the edges of said deformation tube, whose shape corresponds to the edges of said elevations and said recesses of said deforming cone, are formed by folded straps in the area of at least one end-side notch of said deformation tube.

6. A deformation device in accordance with claim 1, wherein said deforming cone has a shape expanding in the shape of a trumpet or a torus for the exact control of the deformation of said deformation tube.

7. A deformation device in accordance with claim 1, wherein said deforming cone comprises a bearing seat receiving a mount for a steering axle.

8. A deformation device in accordance with claim 1, wherein said deforming cone comprises a joint fork of a cardan joint of a steering axle.

9. A deformation device in accordance with claim 1, wherein said deforming cone is part of a steering wheel or is connected with a steering wheel in such a way that said deforming cone and the steering wheel rotate in unison, wherein the deformation tube forms part of a steering axle.

10. A deformation device in accordance with claim 1, wherein the elevations of said deforming cone comprise said elevations or attachments with said edges extending essentially in the radial direction of the cone.

11. A deformation device in accordance with claim 1, wherein the elevations of said deforming cone comprise attachments with cutting edge-like areas extending essentially in the radial direction of the cone.

12. A deformation device in accordance with claim 1, wherein said edge of said deforming cone is defined by elevations of said deforming cone and the edges of said deformation tube, whose shape corresponds to the edges of said elevations and said recesses of said deforming cone, are formed by folded straps in the area of at least one end-side notch of said deformation tube.

13. A deformation device in accordance with claim 1, wherein said deformation tube has a plurality of straps formed at an end of said deformation tube, one undeformed strap being adjacent a deformed strap bent in an outward direction, said undeformed strap defining said edges of said deformation tube.

14. A deformation device in accordance with claim 1, wherein folded straps of said deformation tube are arranged at an inner circumference of notches in an end area of said deformation tube, said folded strap defining a plurality of recesses, wherein contours at said deformation cone are arranged in said recesses, each contour having a shape corresponding to an edge of one of said folded straps.

15. A deformation device in accordance with claim 14, wherein said contours are formed by cuboid elevations in a cylindrical area of said deforming cone.

16. A deformation device in accordance with claim 1, wherein said deformation tube is formed by two cardan joints, said deforming cone being integrally connected to one of said cardan joints.

17. A deformation device in accordance with claim 1, wherein said deforming cone is designed as a fork of a cardan joint.

18. A deformation device in accordance with claim 1, wherein said deformation device is a motor vehicle steering component.

19. A motor vehicle steering component deformation device comprising:
a deformation tube, which can be deformed in a defined manner at least at one end, said deformation tube including at least one edge surface;
a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision.

20. A motor vehicle steering component deformation device comprising:
a deformation tube, which can be deformed in a defined manner at least at one end, said deformation tube including at least one edge surface;
a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said at least one edge of said deforming cone having a plurality of elevation elements defining a plurality of recesses, one of said elevation elements being adjacent one of said recesses, said edge of said deformation tube having a plurality of elevation engaging portions and a plurality of recess engaging portions, one of said elevation engaging portions of said deformation tube being located adjacent one of said plurality of recess engaging portions of said deformation tube, one of said elevation engaging portions of said deformation tube engaging one of said elevation elements of said deforming cone, one of said recesses of said deforming cone receiving one of said recess engaging portions of said deformation tube.

21. A motor vehicle steering component deformation device comprising:
a deformation tube, which can be deformed in a defined manner at least at one end, said deformation tube including at least one edge surface;
a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said edge of said deforming cone being defined by elevations of said deforming cone formed by a truncated pyramid-shaped area of the deforming cone, said truncated pyramid-shaped area having at least one side.

22. A motor vehicle steering component deformation device comprising:
   a deformation tube, which can be deformed in a defined manner at least at one end, said deformation tube including at least one edge surface;
   a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said edge of said deforming cone being defined by elevations of said deforming cone and the edges of said deformation tube, whose shape corresponds to the edges of the elevations of said deforming cone, being formed by groove-like recesses arranged on the inner circumference of the deformation tube in the longitudinal direction.

23. A motor vehicle steering component deformation device comprising:
   a deformation tube, which can be deformed in a defined manner at least at one end, said deformation tube including at least one edge surface;
   a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said edge of said deforming cone being defined by elevations of said deforming cone and the edges of said deformation tube, whose shape corresponds to the edges of the elevations of said deforming cone, being formed by incisions into said deformation tube, said incisions extending along surface lines of said deformation tube.

24. A motor vehicle steering component deformation device comprising:
   a deformation tube, which can be deformed in a defined manner at least at one end, said deformation tube including at least one edge surface;
   a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said deforming cone having a shape expanding in the shape of a trumpet or a torus for controlling deformation of said deformation tube.

25. A motor vehicle steering component deformation device comprising:
   a deformation tube, which can be deformed in a defined manner at least at one end, said deformation tube including at least one edge surface;
   a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said deforming cone comprising a bearing seat receiving a mount for a steering axle.

26. A motor vehicle steering component deformation device comprising:
   a deformation tube, which can be deformed in a defined manner at least at one end, said deformation tube including at least one edge surface;
   a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said deforming cone comprising a joint fork of a cardan joint of a steering axle.

27. A motor vehicle steering component deformation device comprising:

a deformation tube, which can be deformed in a defined manner at least at one end, said deformation tube including at least one edge surface;

a deforming cone having an edge that corresponds in shape to said edge surface of said deformation tube and engages said edge surface of said deformation tube in a positive force transmitting manner such that said edge of said deforming cone engages said at least one edge of said deformation tube in a circumferential direction of said deforming cone, wherein said edge surface of said deforming cone extends along said edge surface of said deformation tube in a longitudinal direction of said deforming cone, said deforming cone having a surface pressed partially into the end of said deformation tube to provide a friction connection with said surface pressed partially into the end of said deformation tube causing deformation of said deformation tube in the case of said deforming cone moving axially with respect to said deformation tube in the case of a vehicle collision, said deforming cone being part of a steering wheel or being connected with a steering wheel such that said deforming cone and the steering wheel rotate in unison, said deformation tube forming part of a steering axle.

28. A deformation device of a motor vehicle the deformation device comprising:

a deformation tube, which can be deformed in a defined manner at least at one end, said deformation tube including at least one elevation, impression or recess with edges;

a deforming cone associated with the deformable end of the deformation tube, said deforming cone having at least one elevation or recess with edges that correspond in shape to and engage said edges of said at least one elevation, impression or recess of said deformation tube, in a positive manner, said deforming cone being pressed partially into the end of said deformation tube in a non-positive manner, said edges of said deformation tube overlapping with said edges of said deforming cone in a radial direction of said deforming cone and said deformation tube such that said edges of said deformation tube engage said edges of said deforming cone in a circumferential direction of said deforming cone and said deformation tube, said deformation tube having a plurality of straps formed at an end of said deformation tube, one undeformed strap being adjacent to a deformed strap bent in an outward direction, said undeformed strap defining said edges of said deformation tube.

29. A deformation device of a motor vehicle the deformation device comprising:

a deformation tube, which can be deformed in a defined manner at least at one end, said deformation tube including at least one elevation, impression or recess with edges;

a deforming cone associated with the deformable end of the deformation tube, said deforming cone having at least one elevation or recess with edges that correspond in shape to and engage said edges of said at least one elevation, impression or recess of said deformation tube, in a positive manner, said deforming cone being pressed partially into the end of said deformation tube in a non-positive manner, said edges of said deformation tube overlapping with said edges of said deforming cone in a radial direction of said deforming cone and said deformation tube such that said edges of said deformation tube engage said edges of said deforming cone in a circumferential direction of said deforming cone and said deformation tube, wherein folded straps of said deformation tube are arranged at an inner circumference of notches in an end area of said deformation tube, said folded straps defining a plurality of recesses, wherein contours at said deformation cone are arranged in said recesses, each contour having a shape corresponding to an edge of one of said folded straps.

30. A deformation device of a motor vehicle the deformation device comprising:

a deformation tube, which can be deformed in a defined manner at least at one end, said deformation tube including at least one elevation, impression or recess with edges;

a deforming cone associated with the deformable end of the deformation tube, said deforming cone having at least one elevation or recess with edges that correspond in shape to and engage said edges of said at least one elevation, impression or recess of said deformation tube, in a positive manner, said deforming cone being pressed partially into the end of said deformation tube in a non-positive manner, said edges of said deformation tube overlapping with said edges of said deforming cone in a radial direction of said deforming cone and said deformation tube such that said edges of said deformation tube engage said edges of said deforming cone in a circumferential direction of said deforming cone and said deformation tube, wherein folded straps of said deformation tube are arranged at an inner circumference of notches in an end area of said deformation tube, said folded straps defining a plurality of recesses, wherein contours at said deformation cone are arranged in said recesses, each contour having a shape corresponding to an edge of one of said folded straps, said contours being formed by cuboid elevations in a cylindrical area of said deforming cone.

* * * * *